(12) United States Patent
Matsuda et al.

(10) Patent No.: US 6,496,207 B1
(45) Date of Patent: Dec. 17, 2002

(54) COLLISION DETECTION APPARATUS AND METHOD FOR AVATARS IN A THREE-DIMENSIONAL VIRTUAL SPACE

(75) Inventors: Koichi Matsuda, Tokyo; Hiroyuki Hanaya, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/205,947

(22) Filed: Dec. 4, 1998

(30) Foreign Application Priority Data

Dec. 15, 1997 (JP) .............................. 9-363127

(51) Int. Cl.$^7$ ................................. G06F 3/14
(52) U.S. Cl. ..................................... 345/848
(58) Field of Search ................ 345/419, 420, 345/349, 332, 331, 976, 355, 848, 849, 850, 862, 757, 751, 759

(56) References Cited

U.S. PATENT DOCUMENTS

| | | | | | |
|---|---|---|---|---|---|
| 5,347,306 | A | * | 9/1994 | Nitta ............................ | 348/15 |
| 5,491,743 | A | * | 2/1996 | Shiio et al. .................. | 709/204 |
| 5,880,731 | A | * | 3/1999 | Liles et al. .................. | 345/349 |
| 5,884,029 | A | * | 3/1999 | Brush, II et al. ........... | 709/202 |
| 5,907,328 | A | * | 5/1999 | Brush, II et al. ........... | 345/358 |
| 5,956,038 | A | * | 9/1999 | Rekimoto .................... | 345/419 |
| 6,049,341 | A | * | 4/2000 | Mitchell et al. ............. | 345/473 |
| 6,057,856 | A | * | 5/2000 | Miyashita et al. .......... | 345/435 |
| 6,091,410 | A | * | 7/2000 | Lection et al. .............. | 345/330 |
| 6,131,097 | A | * | 10/2000 | Peurach et al. ............. | 707/102 |
| 6,154,211 | A | * | 11/2000 | Kamachi et al. ............ | 345/355 |
| 6,166,744 | A | * | 12/2000 | Jaszlics et al. .............. | 345/435 |

FOREIGN PATENT DOCUMENTS

| JP | 9-81781 | 3/1997 | ........... G06T/17/00 |
|---|---|---|---|

OTHER PUBLICATIONS

K. Matsuda, "Latest Trends of VRML and Cyberpassage VRML 2.0 and Java (Part 1)," BIT, Jul. 1996, vol. 28, No. 7, pp. 29–36, English Translation pp. 1–25.

K. Matsuda, "Latest Trends of VRML and Cyberpassage VRML 2.0 and Java (Part 2)," BIT, Aug. 1996, vol. 28, No. 8, pp. 57–65, English Translation pp. 1–27.

Y. Honda, "Latest Trends of VRML and Cyberpassage– VRML + Network = Cyberspace?" BIT, Sep. 1996, vol. 28, No. 9, pp. 29–36, English Translation pp. 1–25.

Y. Honda, "Latest Trends of VRML and Cyberpassage– How to Build Multi–User Environment Using Cyberspace," BIT, Oct. 1996, vol. 28, No. 10, pp. 49–58, English Translation pp. 1–27.

* cited by examiner

Primary Examiner—Kristine Kincaid
Assistant Examiner—Thomas T. Nguyen
(74) Attorney, Agent, or Firm—Oblon, Spivak, McClelland, Maier & Neustadt, P.C.

(57) ABSTRACT

The invention presents to a user a situation of the collision of an avatar against another object in a three-dimensional virtual space in an easy-to-understand manner. When the avatar is being navigated forward in the three-dimensional virtual space, if the avatar collides at its head node against a fixed object arranged in the three-dimensional virtual space (the object simulating a billboard, for example), an alert frame is displayed in the upper portion of the display area of a browser for displaying the three-dimensional virtual space. At the same time, an artificial collision sound is outputted. Thus, the alert frame corresponding to the colliding node is displayed and different collision sounds are outputted according to colliding nodes, so that the collision situation is presented to the user in an intuitively understandable manner.

25 Claims, 16 Drawing Sheets

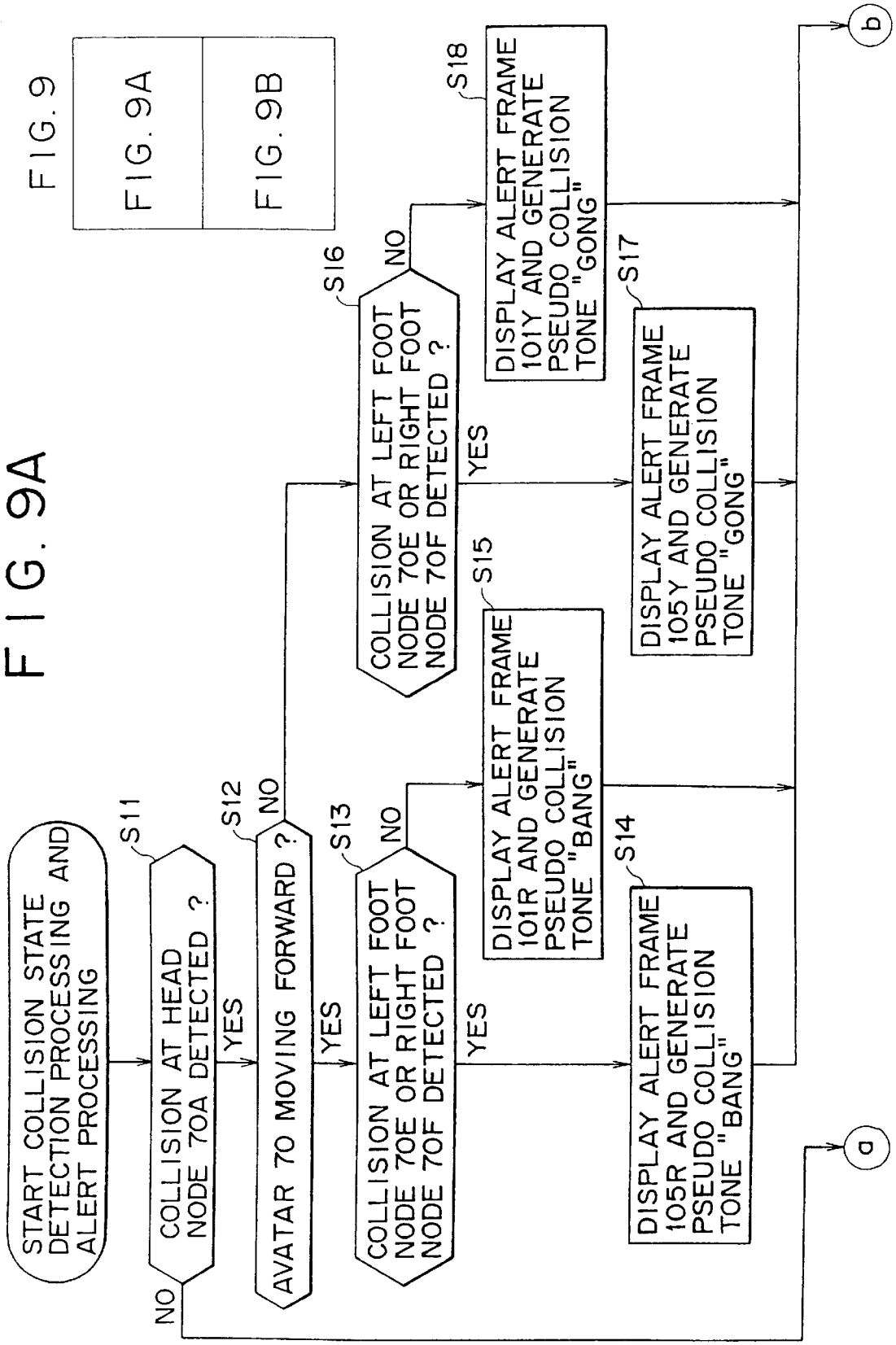

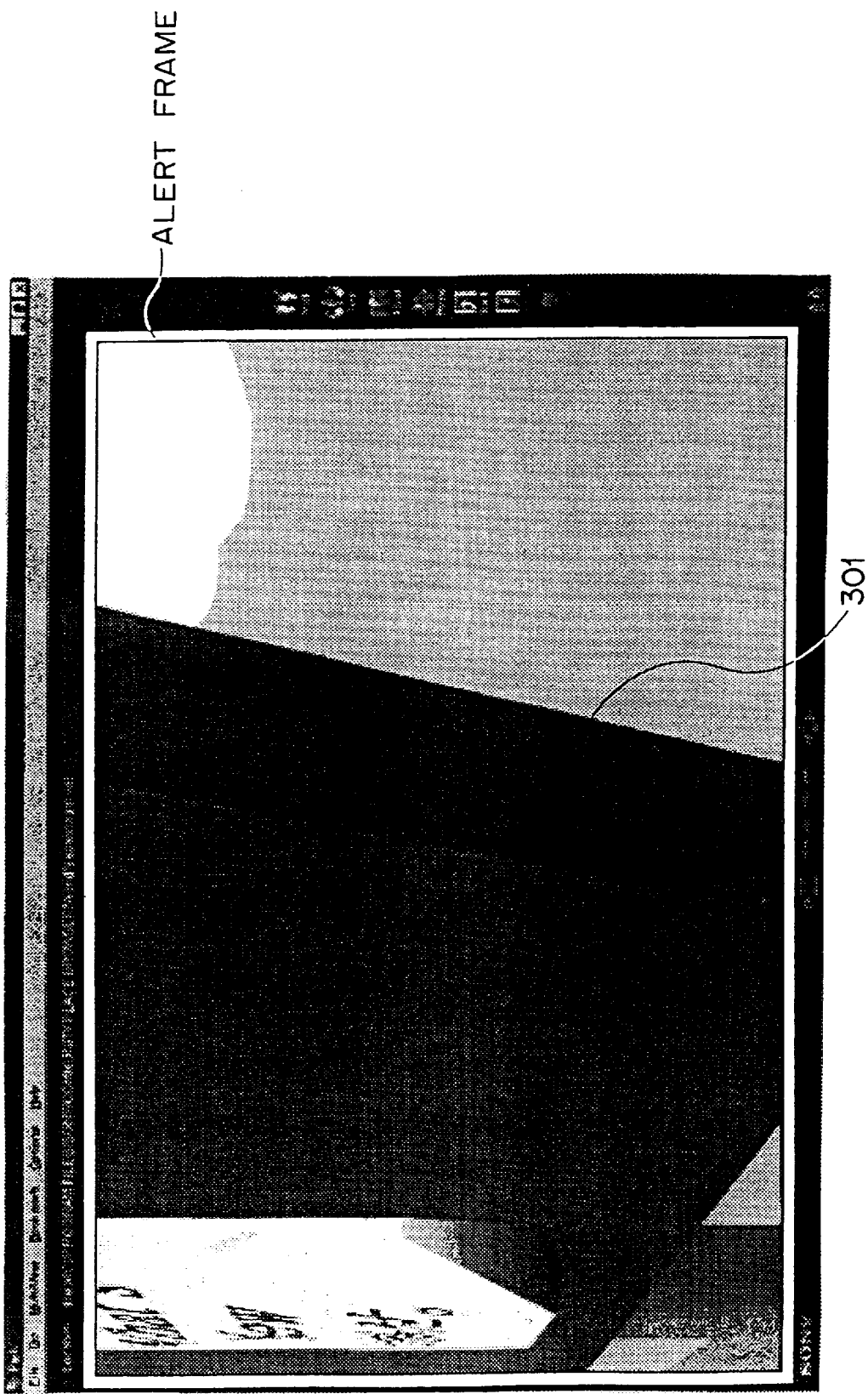

COLLISION DETECTION APPARATUS AND METHOD FOR AVATARS IN A THREE-DIMENSIONAL VIRTUAL SPACE

BACKGROUND OF THE INVENTION

1. Field of the Invention

The presents invention generally relates to a three-dimensional virtual space information processing apparatus, a three-dimensional virtual space information processing method, and a medium for providing a three-dimensional virtual space information processing program. More particularly, the present invention relates to a three-dimensional virtual space information processing apparatus, a three-dimensional virtual space information processing method, and a medium for providing a three-dimensional virtual space information processing program that, when an avatar moving in a three-dimensional virtual space collides against a predetermined object, present in an easy-to-understand manner the collision situation of the avatar by making an alert corresponding to a collision portion of the avatar.

2. Description of Related Art

A cyberspace service named Habitat (trademark) is known in the so-called personal computer communications services such as NIFTY-Serve (trademark) of Japan and CompuServe (trademark) of US in which a plurality of users connect their personal computers via modems and public telephone network to the host computers installed at the centers of the services to access them in predetermined protocols.

Development of Habitat started in 1985 by Lucas Film of the US, operated by Quantum Link, one of US commercial networks, for about three years. Then, Habitat started its service in NIFTY-Serve as Fujitsu Habitat (trademark) in February 1990. In Habitat, users can send their alter egos called avatars (the incarnation of a god figuring in the Hindu mythology) into a virtual city called Populopolis drawn by two-dimensional graphics to have a chat (namely, a realtime conversation based on text entered and displayed) with each other. For further details of Habitat, refer to the Japanese translation of "Cyberspace: First Steps," Michael Benedikt, ed., 1991, MIT Press Cambridge, Mass., ISBN0-262-02327-X, the translation being published Mar. 20, 1994, by NTT Publishing, ISBN4-87188-265-9C0010, pp. 282–307.

However, in the related art cyberspace system, a virtual street, a virtual room interior, and the like are drawn in two-dimensional graphics. In such an environment, movement of an avatar backward or forward is realized simply by moving it up or down in a two-dimensional background, providing poor representation for enabling the user to experience walk or movement in the virtual space. Because this scheme makes the user look at the virtual space in which the user's avatar and another user's avatar are shown from the viewpoint of a third person, the sense of pseudo experience is marred to a large extent.

To solve these problems, a capability that displays a virtual space in three-dimensional graphics and allows the user to freely walk with the viewpoint of the avatar in the displayed three-dimensional space is implemented by use of a three-dimensional graphics data description language called VRML (Virtual Reality Modeling Language) as disclosed in Japanese Patent Laid-Open No. Hei 9-81781. Details of VRML are disclosed in the Japanese translation of "VRML: Browsing & Building Cyberspace," Mark Pesce, 1995, New Readers Publishing, ISBN 1-56205-498-8, the translation being entitled "Getting to Know VRML: Building and Browsing Three-Dimensional Cyberspace," translated by Kouichi Matsuda, Terunao Gamachi, Shouichi Takeuchi, Yasuaki Honda, Junichi Rekimoto, Masayuki Ishikawa, Takeshi Miyashita and Kazuhiro Hara, published Mar. 25, 1996, Prenticehall Publishing, ISBN4-931356-37-0 and "Recent Trends of VRML And CyberPassage," by Kouichi Matsuda and Yasuaki Honda, The "bit" Magazine, Kyoritsu Publising, 1996 (Vol. 28, No. 7, pp. 29 through 36, No. 8, pp. 57 through 65, No. 9, pp. 29 through 36, No. 10, pp. 49 through 58) for example.

The official and complete specifications of "The Virtual Reality Modeling Language Version 2.0, ISO/IEC CD 14772" are published on the Internet.

VRML 2.0, the latest version of VRML, claims that it can describe and represent the autonomous behavior of an object in a three-dimensional virtual space. Therefore, when walking around with a viewpoint of an avatar in a virtual space represented by three-dimensional graphics in a browser for VRML 2.0, namely a three-dimensional virtual space, a user of that avatar can have a sensation as if he or she is actually in that space.

For the above-mentioned VRML 2.0 browser and the software for a shared server, "Community Place (trademark) Browser/Bureau" has been developed and commercialized by Sony Corporation, the applicant hereof. Its beta version (namely the test version) can be downloaded from Sony's Internet home page.

Referring to FIG. 14, there is illustrated an example of a three-dimensional virtual space as displayed in a related-art VRML browser (hereafter simply referred to as a browser). As shown, if an avatar being navigated by its user in the three-dimensional space displayed in the browser collides against a fixed object 301 simulating a billboard, for example arranged in the virtual space, a frame indicative of the collision is displayed on the four sides of the display area of the browser (the frame hereafter referred to as an alert frame). At the same time, an artificial collision sound (an alert sound) is generated. Thus, the user is alerted that the avatar collided against the fixed object 301.

However, the provision of this alert frame alone presents a problem of making it difficult for the user to understand a situation in which an avatar collides against an object not appearing in the avatar's visibility range, or the browser display area. This situation includes, for example, that the avatar being navigated with its viewpoint directed upward (the browser display area set upward) collides against an object simulating a stone (this object currently not appearing in the browser display range) lying at a foot of the avatar and cannot move forward any further and that the avatar being navigated backward (the browser display area set forward) collides at its back against an object simulating a building wall (this object not appearing in the browser display range) and cannot move backward any further.

SUMMARY OF THE INVENTION

It is therefore an object of the present invention to provide an easy-to-understand presentation of a situation in which an avatar collides against an object in a three-dimensional virtual space.

A three-dimensional virtual space information processing apparatus comprises a detecting means for detecting, if an avatar collides against an object in a three-dimensional virtual space, the colliding node of the avatar and an alerting means for providing an alert corresponding to the colliding node detected by the detecting means.

A three-dimensional virtual space information processing method comprises the steps of detecting, if an avatar collides against an object in a three-dimensional virtual space, the colliding node of the avatar and outputting an alert corresponding to the colliding node detected by the detecting step.

A program providing medium provides a computer program comprising the steps of detecting, if an avatar collides against an object in a three-dimensional virtual space, the colliding node of the avatar and outputting an alert corresponding to the colliding node detected by the detecting step.

In the three-dimensional virtual space information processing apparatus described in claim 1, the three-dimensional virtual space information processing method, and the program providing medium, if an avatar collides against a predetermined object, the colliding node of the avatar is detected and an alert corresponding to the colliding node is provided by means of an alert frame and an alert sound for example.

BRIEF DESCRIPTION OF THE DRAWINGS

These and other objects of the invention will be seen by reference to the description, taken in connection with the accompanying drawing, in which:

FIGS. 9, 9A and 9B are flowcharts for describing collision detection processing and alert processing;

FIG. 15 is a photograph of a halftone image shown on the monitor display illustrating a manner in which the avatar 70 is in collision against the object 301 in the three-dimensional virtual space in the related-art browser.

DETAILED DESCRIPTION OF PREFERRED EMBODIMENTS

This invention will be described in further detail by way of example with reference to the accompanying drawings.

Figure 1:
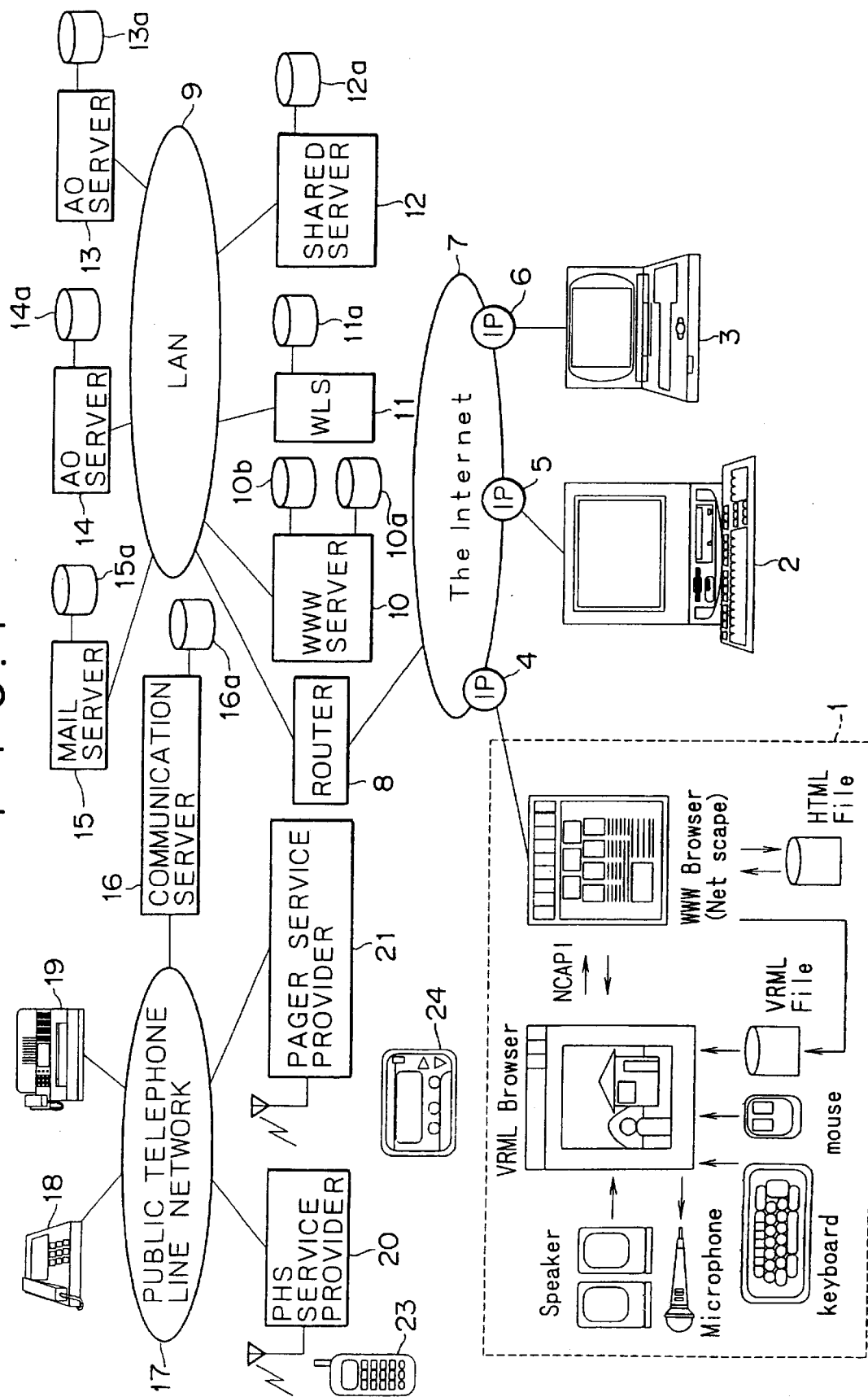
FIG. 1 is a schematic block diagram illustrating an example of a constitution of a shared virtual space providing system practiced as one preferred embodiment of the invention.

Now, referring to FIG. 1, there is shown a constitution of an overall system (the term "system" herein denotes an entity comprising plural logically interconnected devices, which are not necessarily accommodated in a single housing) practiced as one preferred embodiment of the invention.

In FIG. 1, client PCs (Personal Computers) 1 through 3 are connected to the Internet 7 through IPs (Internet service Providers) 4 through 6. A VRML browser and a WWW (World Wide Web) browser are installed on each of the client PCs.

A LAN (Local Area Network) 9 connected to the Internet 7 through a router 8 is connected to a WWW server 10, A WLS (World Location Server) 11, a shared server 12, AO (Application Object) servers 13 and 14, a mail server 15, and a communication server 16. The WWW server 10 is provided with hard disc drives 10a and 10b, the WLS is provided with a hard disc drive 11a, the shared server 12 is provided with a hard disc drive 12a, the AO server 13 is provided with a hard disc drive 13a, the AO server 14 is provided with a hard disc drive 14a, the mail server 15 is provided with a hard disc drive 15a, and the communication server 16 is provided with a hard disc drive 16a.

The communication server 16 is connected to a telephone 18 and a facsimile, 19 through a public telephone line 17, to a PHS (Personal Handyphone System) 23 through a PHS service provider 20, and to a pager 24 through a pager server provider 21.

Figure 2:
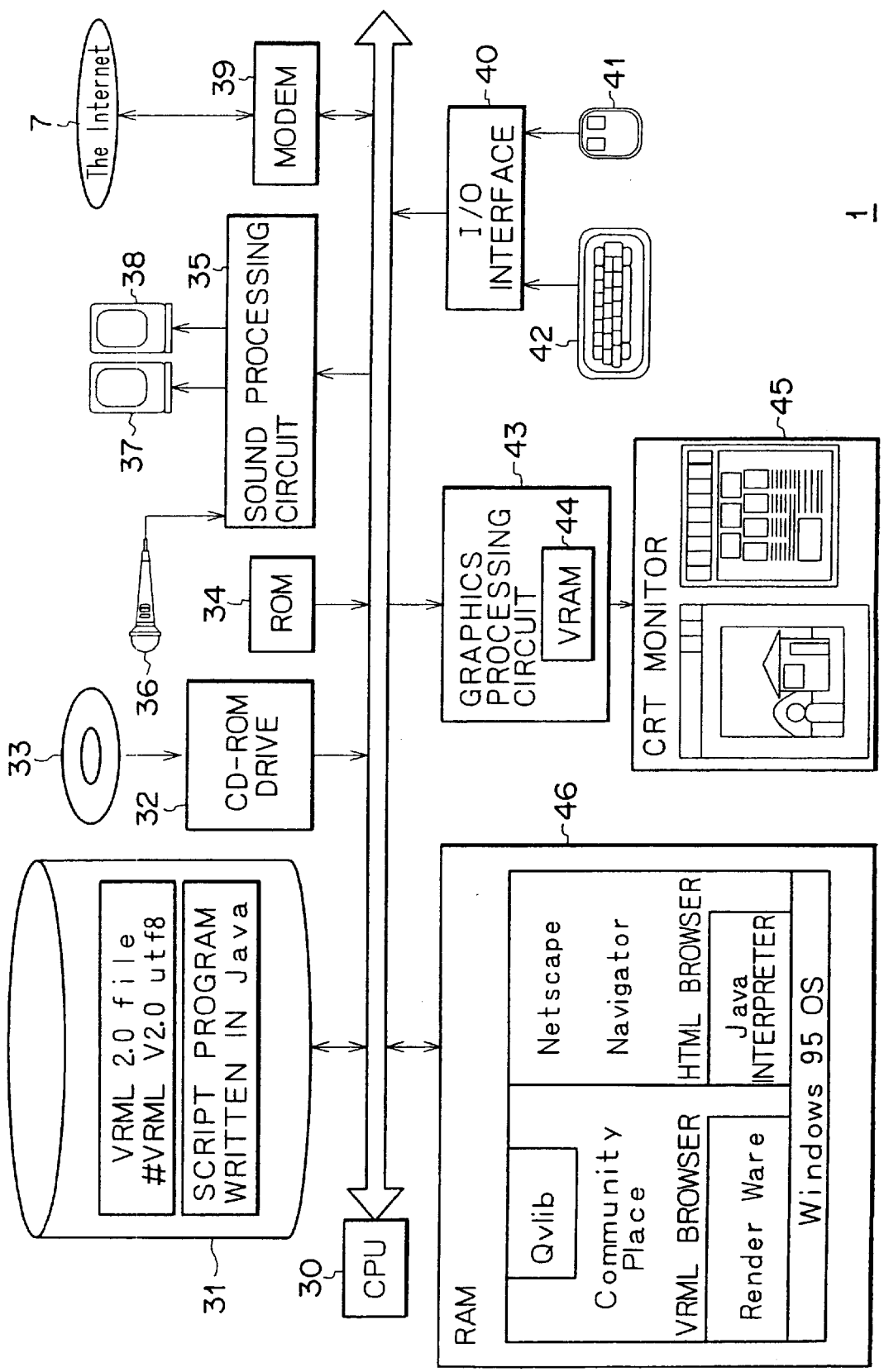
FIG. 2 is a schematic block diagram illustrating an example of a constitution of a client PC 1 shown in FIG. 1.

FIG. 2 shows an example of a hardware constitution of the client PC 1. In this example, a CPU (Central Processing Unit) 30 executes various processing operations as instructed by a program stored in a ROM (Read Only Memory) 34. A HDD 31 stores a VRML 2.0 file and VRML contents composed of predetermined programs written in Java (trademark of Sun Microsystems). A CD-ROM drive 32 reads information such as VRML contents stored in a CD-ROM disc 33.

A sound processor 35 is connected to a microphone 36 and left and right speakers 37 and 38. A voice is inputted through the microphone 36. Music and effect sounds for example are outputted from the speakers 37 and 38. A modem 39 is connected to the Internet 7 for transferring data. An I/O (Input/Output) interface 40 receives an operator signal from a mouse 41 and a keyboard 42. A graphics processor 43 contains a VRAM (Video Random Access Memory) 44 that stores processed image data. The graphics processor 43 displays the image data read from the VRAM 44 onto a CRT monitor 45.

A RAM 46 stores, at the time of execution, Netscape Navigator which is a WWW browser operating on Windows 95 (trademark of Microsoft corporation), a Java interpreter, and Community Place Browser which is a VRML 2.0 browser developed by Sony Corporation the applicant hereof, by way of example. These programs are executed by the CPU 30.

The VRML 2.0 browser is installed with QvLib, which is a VRML syntax interpreting library (namely, parser) developed by Silicon Graphics, Inc. and publicized without charge and RenderWare, which is a software renderer developed by Criterion Software Ltd. or other equivalent parser and renderer.

Community Place Browser transfers various data with Netscape Navigator through NCAPI (Netscape Client Application Programming Interface)(trademark) as shown in FIG. 1.

When Netscape Navigator receives an HTML (Hyper Text Markup Language) file and VRML content (including a VRML file and a script program in Java) from the WWW server 10 over the Internet 7, Netscape Navigator stores the received file and content into the local HDD 31. Netscape Navigator processes the stored HTML file and displays resultant text and image onto the CRT monitor 45. Community Place Browser processes the VRML file to display a three-dimensional space onto the CRT monitor 45 and alters a display state including the behavior of an object in the displayed three-dimensional virtual space according to the processing result of the script program by the Java interpreter.

It should be noted that the other client PCs 2 and 3 are substantially similar in constitution to the client PC 1, the constitutions of the client PCs 2 and 3 not shown.

Figure 3:
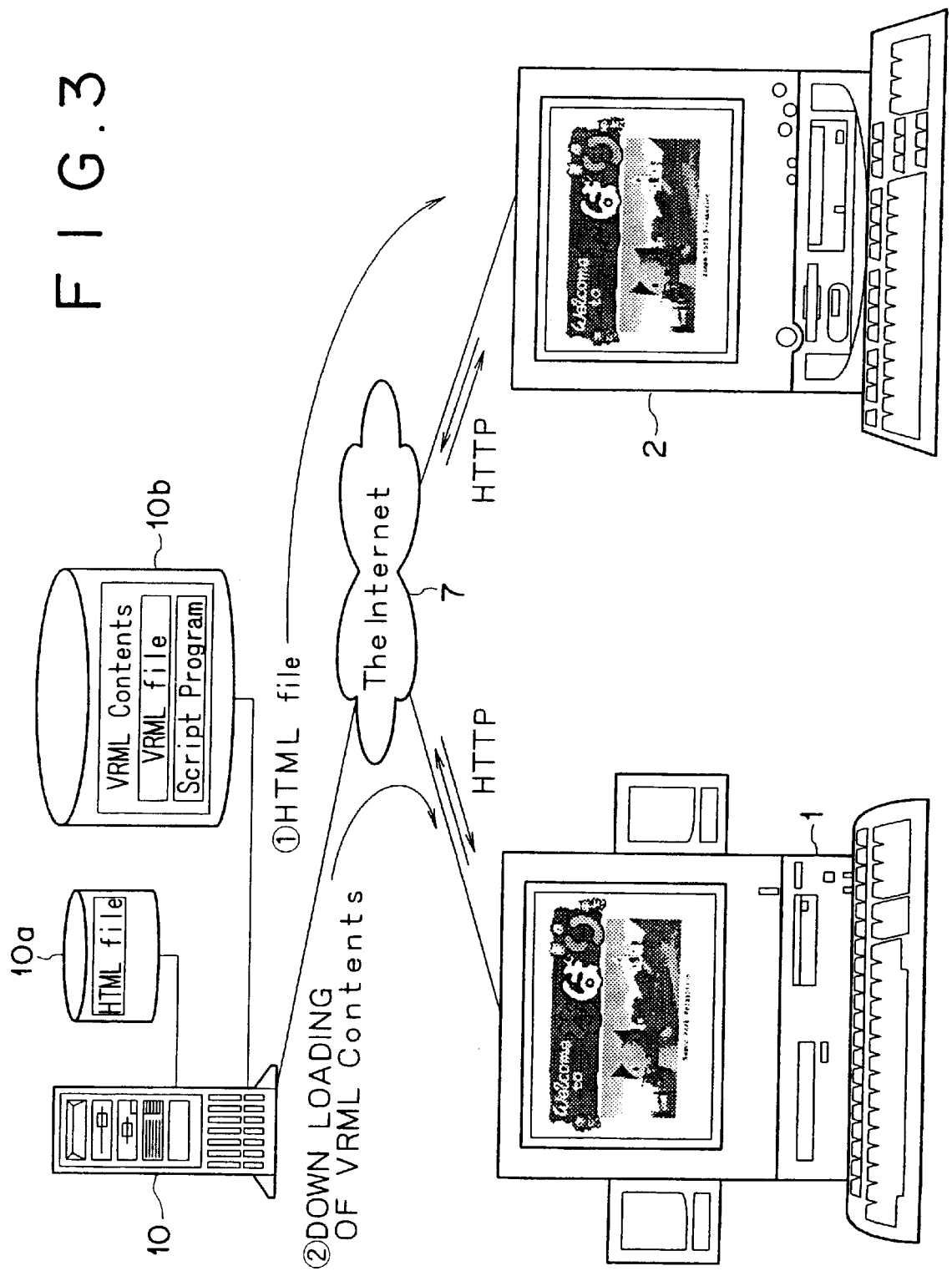
FIG. 3 is a schematic diagram illustrating an operation of the system shown in FIG. 1.

Operations of the above-mentioned embodiment will be described with reference to FIGS. 3 through 5. Referring to FIG. 3, as indicated by number (1), a home page of a Web site that provides VRML content is viewed by use of the WWW browser. In this example, a home page maintained by Sony Corporation is viewed. Next, as indicated by number (2), the user of the client PC 1 or the client PC 2 downloads the VRML content composed of the VRML 2.0 file and a script program (by Java) for implementing an autonomous motion in a VRML space.

Obviously, the VRML content provided with the CD-ROM disc 33 may be read by the CD-ROM drive 32.

Figure 4:
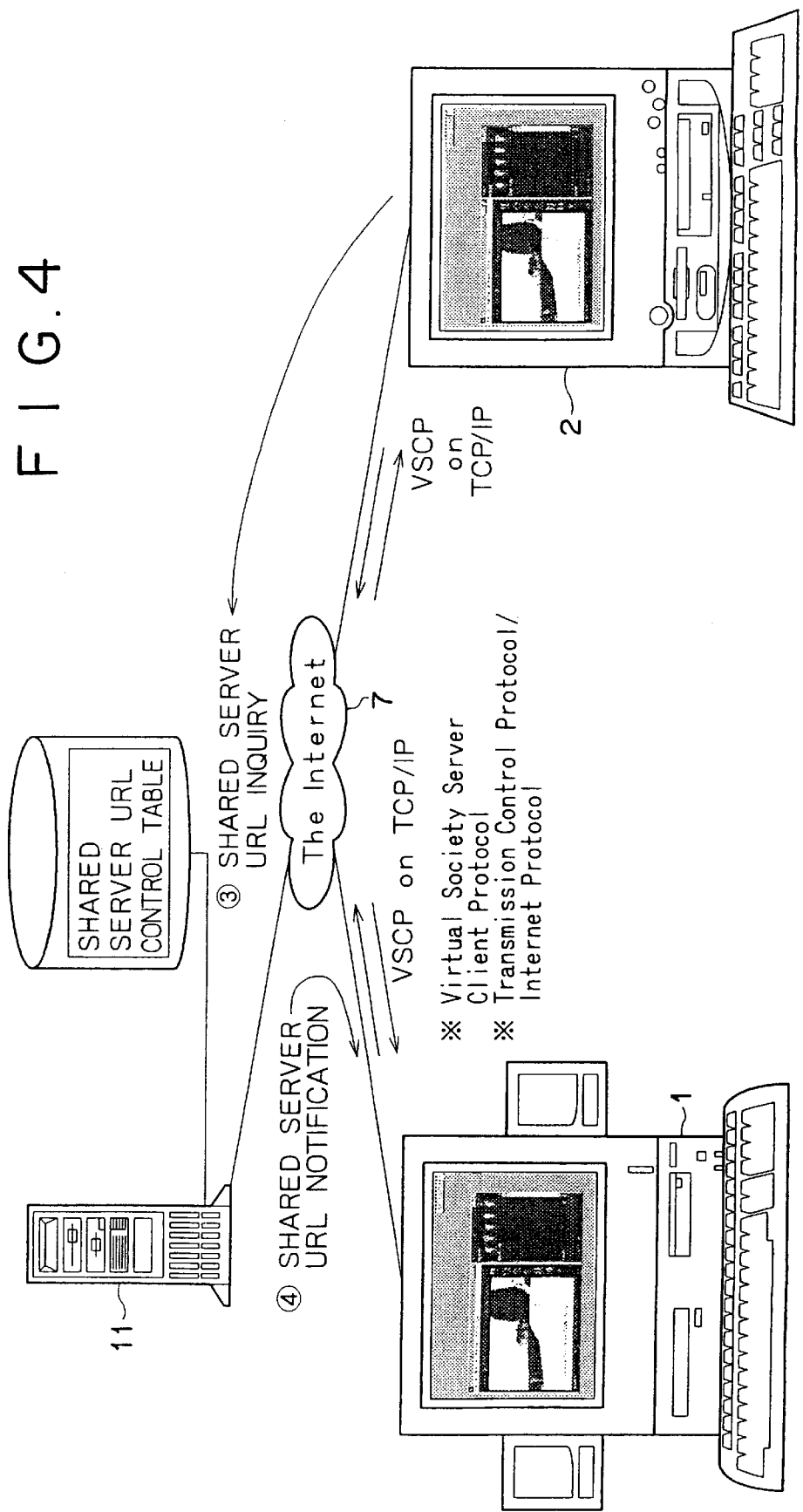
FIG. 4 is a schematic diagram illustrating another operation of the system shown in FIG. 1.

Next, referring to FIG. 4, in the client PC 1 or the client PC 2, Community Place Browser, which is a VRML 2.0 browser, interprets and executes the VRML 2.0 file downloaded and stored in the local HDD 31. Community Place Browser then inquires the WLS 11 for the URL (Universal Resource Locator) of the shared server 12 based on VSCP (Virtual Society Server Client Protocol) as indicated by number (3). At this moment, as indicated by number (4), the WLS 11 references an URL control table stored in the HDD 11a and sends the URL of the shared server 12 to the client PC 1 or the client PC 2.

Figure 5:
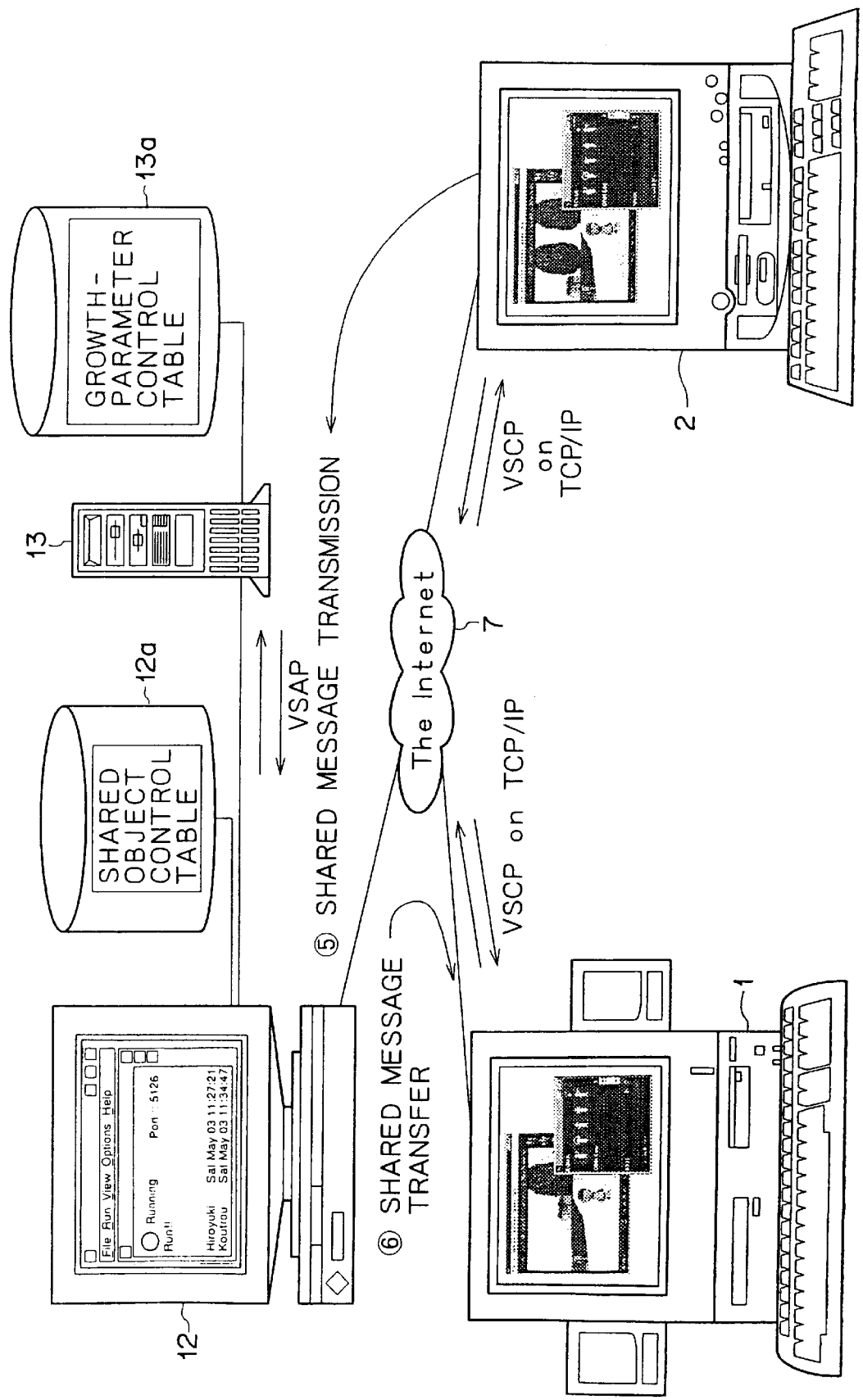
FIG. 5 is a schematic diagram illustrating still another operation of the system shown in FIG. 1.

By use of this URL, the client PC 1 and the Client PC 2 are connected to the shared server 12 as shown in FIG. 5. Consequently, as indicated by number (5), a shared message associated with the location and movement of a shared three-dimensional (3D) object is sent from a client PC to the shared server 12, from which the shared message is transferred to the other client PC as indicated by number (6). Thus, a multiuser environment is realized.

For details of the above-mentioned connection procedure, refer to Japanese Patent Laid-Open No. Hei 9-81781.

In the above-mentioned embodiment, the three-dimensional virtual space is used in the multiuser environment. It is also practicable that the three-dimensional virtual space is not used in the multiuser environment, namely the three-dimensional virtual space is used in a single-user environment. To be more specific, any avatar (drawn avatar) other than the avatar (pilot avatar) of a particular user can be prevented from entering the three-dimensional virtual space of that particular user and the pilot avatar can be prevented from appearing in the three-dimensional virtual space of any other user. This can be implemented by skipping the processing operations indicated by numbers (3) through (6) shown in FIGS. 4 and 5.

Figure 6:
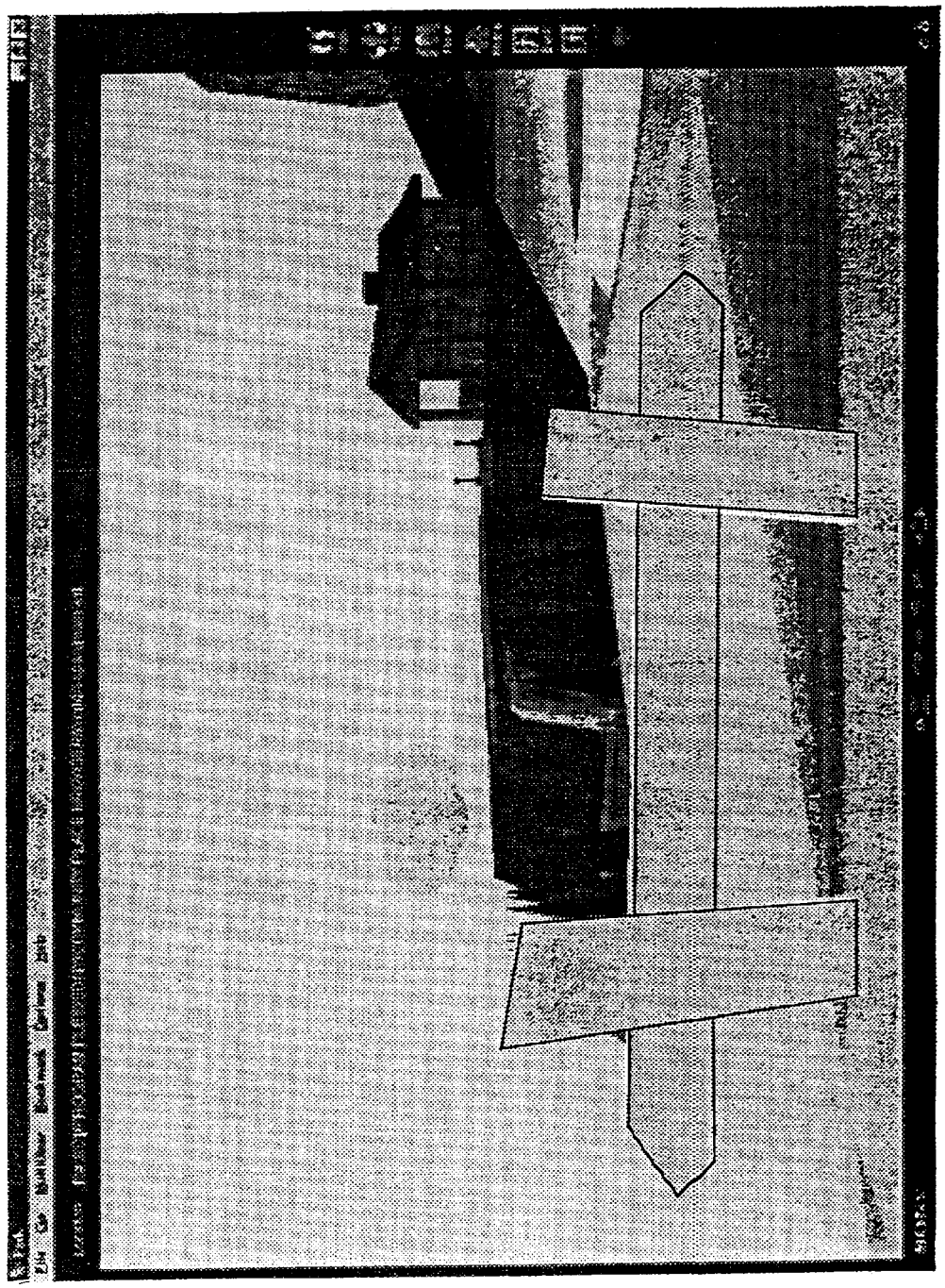
FIG. 6 is a photograph of a halftone image shown on a monitor display as a display example of a browser.

As described with reference to FIG. 4, when the VRML 2.0 file is executed in Community Place Browser, an image of the three-dimensional virtual space as shown in FIG. 6 is displayed on the CRT monitor 45.

In the above-mentioned embodiment, a camera is assumed as an image pickup means for picking up the image of a three-dimensional virtual space and the obtained image (of the three-dimensional virtual space) is displayed on the display area of the browser. In addition, the above-mentioned embodiment is adapted to switch between (1) the first person mode in which the viewpoint of the avatar of a particular user matches the position of the camera and (2) the third person mode in which there is no match (namely the avatar is displayed in the display area of the browser).

To be more specific, FIG. 6 shows a display screen of the first person mode in which there is a match between the avatar's viewpoint (including both the coordinates of a point at which the avatar's eye is located in the three-dimensional virtual space and the direction in which the avatar is looking (namely the direction of sight line)) and the camera position (including both the coordinates of a point at which the camera is located in the three-dimensional virtual space and the direction in which the camera is shooting). In the first person mode, the user can freely walk in the three-dimensional virtual space relying on the viewpoint of the user's avatar. Therefore, in the first person mode, the user cannot see his or her avatar (however, in the multiuser environment, the user can see another user's avatar (drawn avatar) if any.

Figure 7:
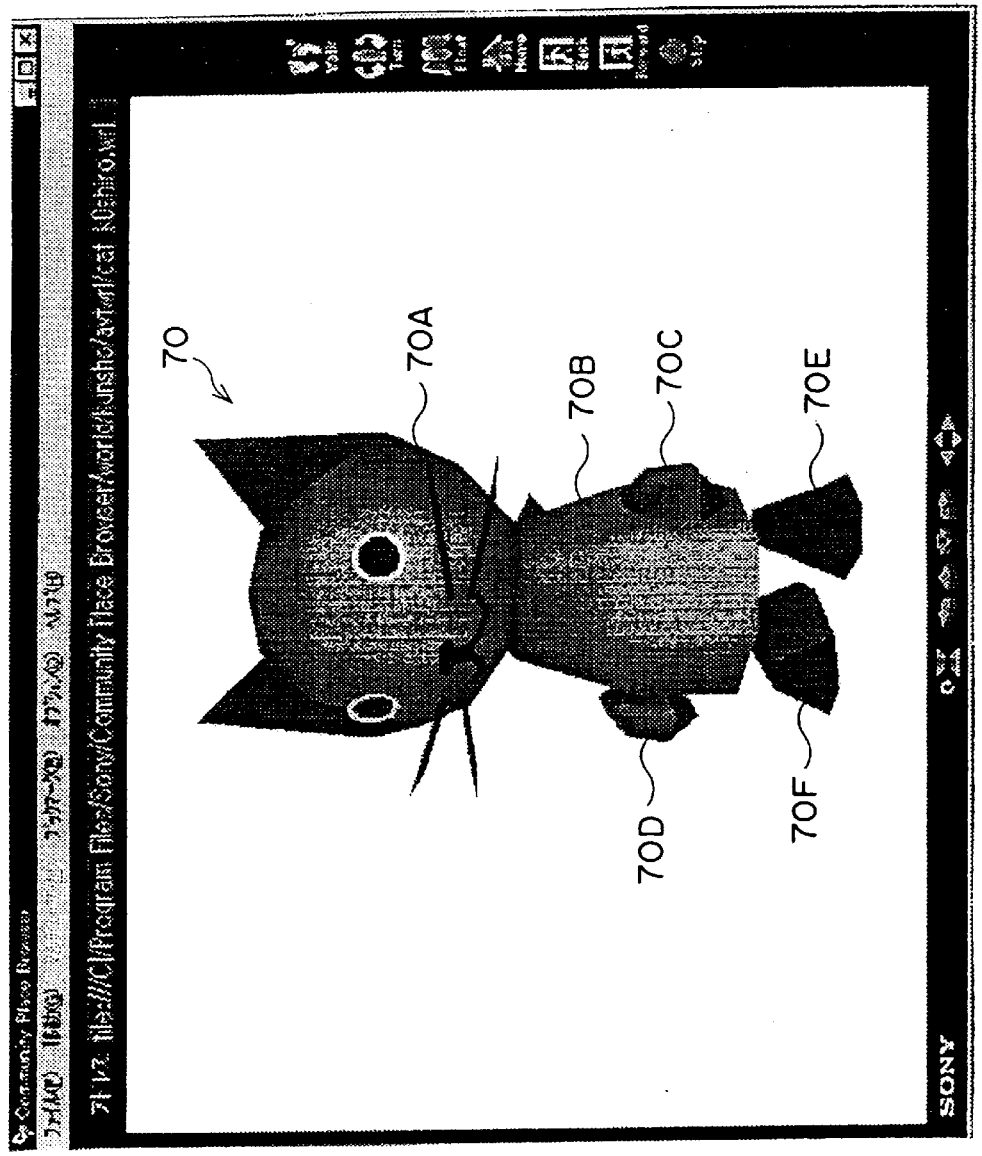
FIG. 7 is a photograph of a halftone image shown on the monitor display as a display example of an avatar 70.

FIG. 7 shows a display example of the avatar 70 that can be navigated in a three-dimensional virtual space. In this example, the avatar (parent node) 70 is formed by a head node 70A, a body node 70B, a left-arm node 70C, a right-arm node 70D, a left-food node 70E, and a right-foot node 70F.

In the above-mentioned embodiment, if the avatar 70 collides against another object (including the drawn avatar of another user) while moving in the three-dimensional virtual space, the colliding node of the avatar can be detected. In this example, the points for sensing the collision are set to five nodes of head node 70A, the left-arm node 70C, the right-arm node 70D, the left-foot node 70E, and the right-foot node 70F. If any of these five nodes collides against a predetermined object in the three-dimensional virtual space, an alert corresponding to the colliding node is given.

Figure 8A:
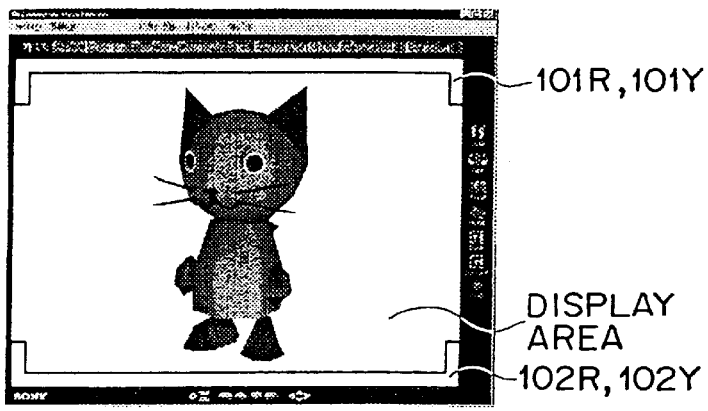
FIGS. 8A, 8B, and 8C are photographs of halftone images shown in the monitor display as display examples of alert frames corresponding to colliding nodes of the avatar 70.
Figure 8B:
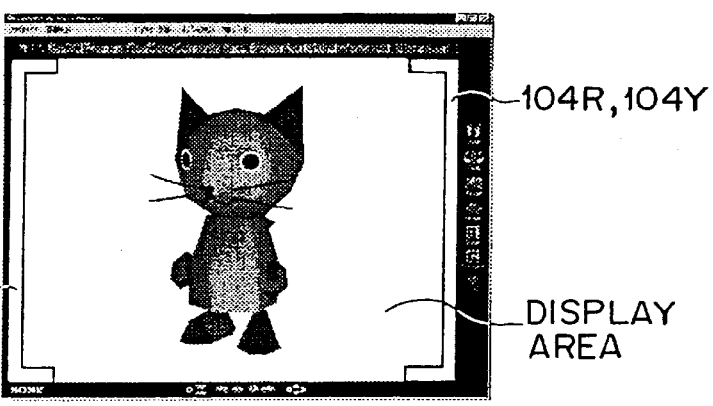
Figure 8C:
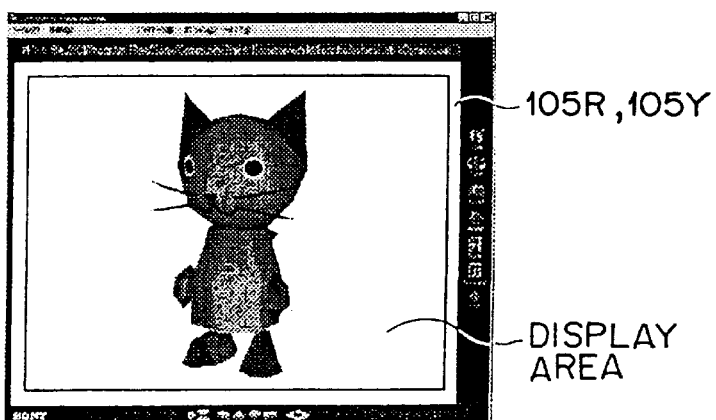

FIGS. 8A through 8C show display examples of alert frames for alerting the user of the collision of the avatar 70 against a predetermined object. If the front portion of the head node 70A of the avatar 70 collides against the predetermined object, a red alert frame 101R is displayed in the upper portion of the browser display area as shown in FIG. 8A. If the rear portion of the head node 70A collides against the predetermined object, a yellow alert frame 101Y is displayed in the upper portion of the browser display area as shown in FIG. 8A. If the front portion of the left-foot node 70E or the front portion of the right-foot node 70F of the avatar 70 collides against the predetermined object, a red alert frame 102R is displayed in the lower portion of the browser display area as shown in FIG. 8A. If the rear portion of the left-foot node 70E or the rear portion of the right-foot node 70F of the avatar 70 collides against the predetermined object, a yellow alert frame 102Y is displayed in the lower portion of the browser displayed area as shown in FIG. 8A.

If the front portion of the left-arm node 70C of the avatar 70 collides against predetermined object, a red alert frame 103R is displayed to the left of the browser display area as shown in FIG. 8B. If the rear portion of the left-arm node 70C collides against the predetermined object, a yellow alert frame 103Y is displayed to the left of the browser display area as shown in FIG. 8B. If the front portion of the right-arm node 70D collides against the predetermined object, a red alert frame 104R is displayed to the right of the browser display area as shown in FIG. BB. If the rear portion of the right-arm node 70D collides against the predetermined object, a yellow alert frame 104Y is displayed to. the right of the browser display area as shown in FIG. 8B.

If at least one of the front portion of the head node 70A, the front portion of the left-foot node 70E, and the front portion of the right-foot node 70F collides against the predetermined object, a red alert frame 105R is displayed on the four sides of the browser display area as shown in FIG. 8C. If at least one of the rear portion of the head node 70A, the rear portion of the left-foot node 70E, and the rear portion of the right-foot node 70F collides against the predetermined object, a yellow alert frame 105Y is displayed on the four sides of the browser display area as shown in FIG. 8C.

In the above-mentioned embodiment, the color of the alert frames to be displayed when the front portions of nodes collide against the predetermined object is red and the color of the alert frames to be displayed when the rear portions of nodes collide against the predetermined object is yellow. It will be apparent that other colors may be used for these alert frames.

Figure 9B:
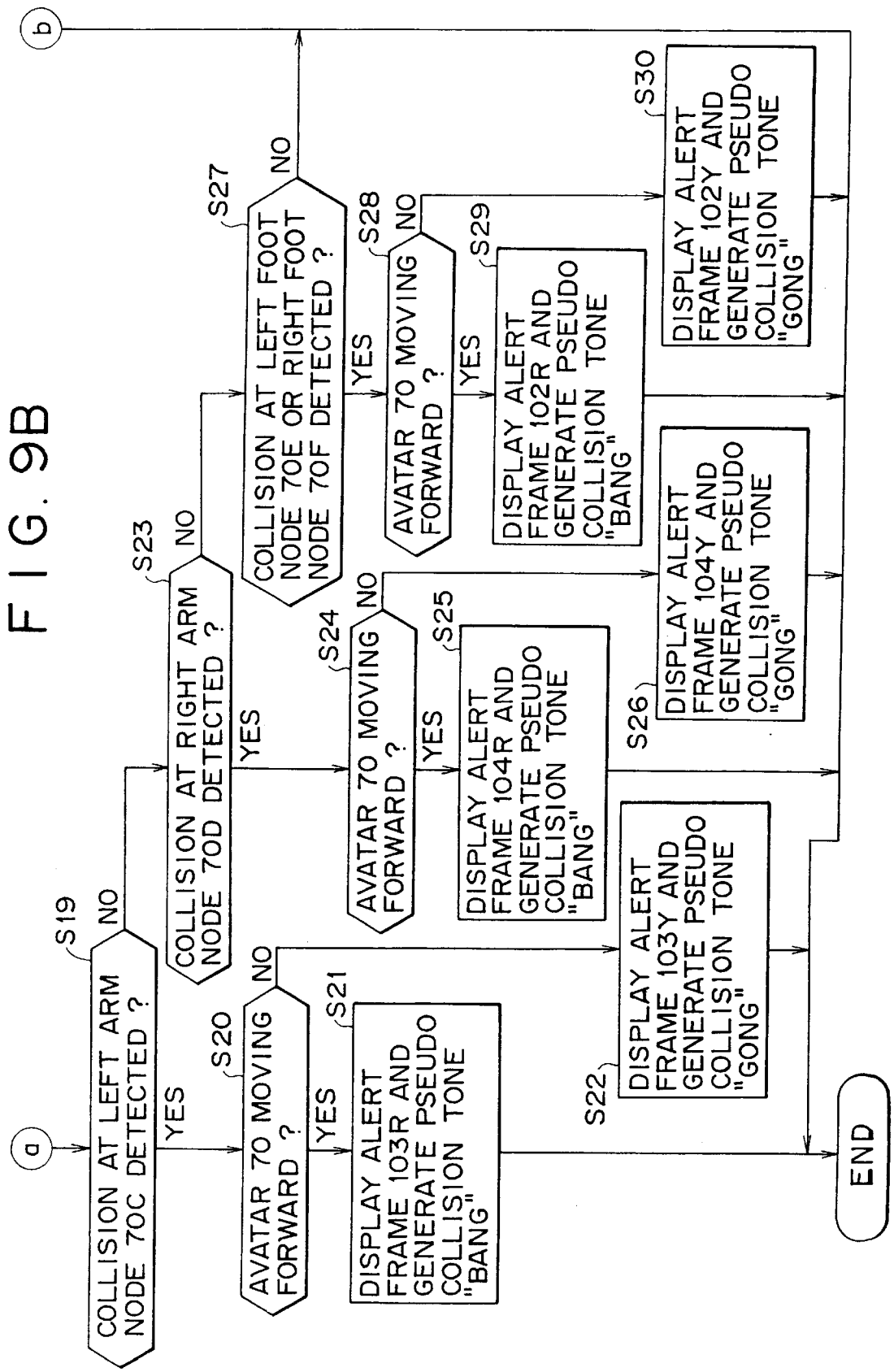

The following describes collision state detection processing and alert processing to be executed when the avatar 70 collides against the predetermined object with reference to FIGS. 9, 9A and 9B. First, in step S11, the CPU 30 determines whether a collision of the head node 70A has been detected or not. If a collision of the head node 70A is not detected, the processing goes to step S19. If a collision of the head node 70A is detected in step S11, the processing goes to step S12, in which the CPU 30 determines whether the avatar 70 is being navigated forward. If the avatar 70 is found not being navigated forward the processing goes to step S16.

In step S12, if the avatar 70 is found being navigated forward, the processing goes to step S13, in which the CPU 30 determines whether a collision at the left-food node 70E or the right-foot node 70F has been detected or not. If the collision at the left-foot node 70E or the right-foot node 70F is detected in step S13, then the CPU 30 controls the graphics processor 43 in step S14 to display the alert frame 105Y in the browser display area. This alert frame indicates which of the front portion of the head node 70A, the front portion of the left-foot node 70E, and the front portion of the right-foot node 70F collided against the predetermined object. In addition, the CPU 30 controls the sound processor 35 to output an artificial collision sound (an alert sound) "Bang" from the speakers 37 and 38 indicating that the front portion of the avatar 70 has collided against the predetermined object. Then, the processing comes to an end.

Figure 10:
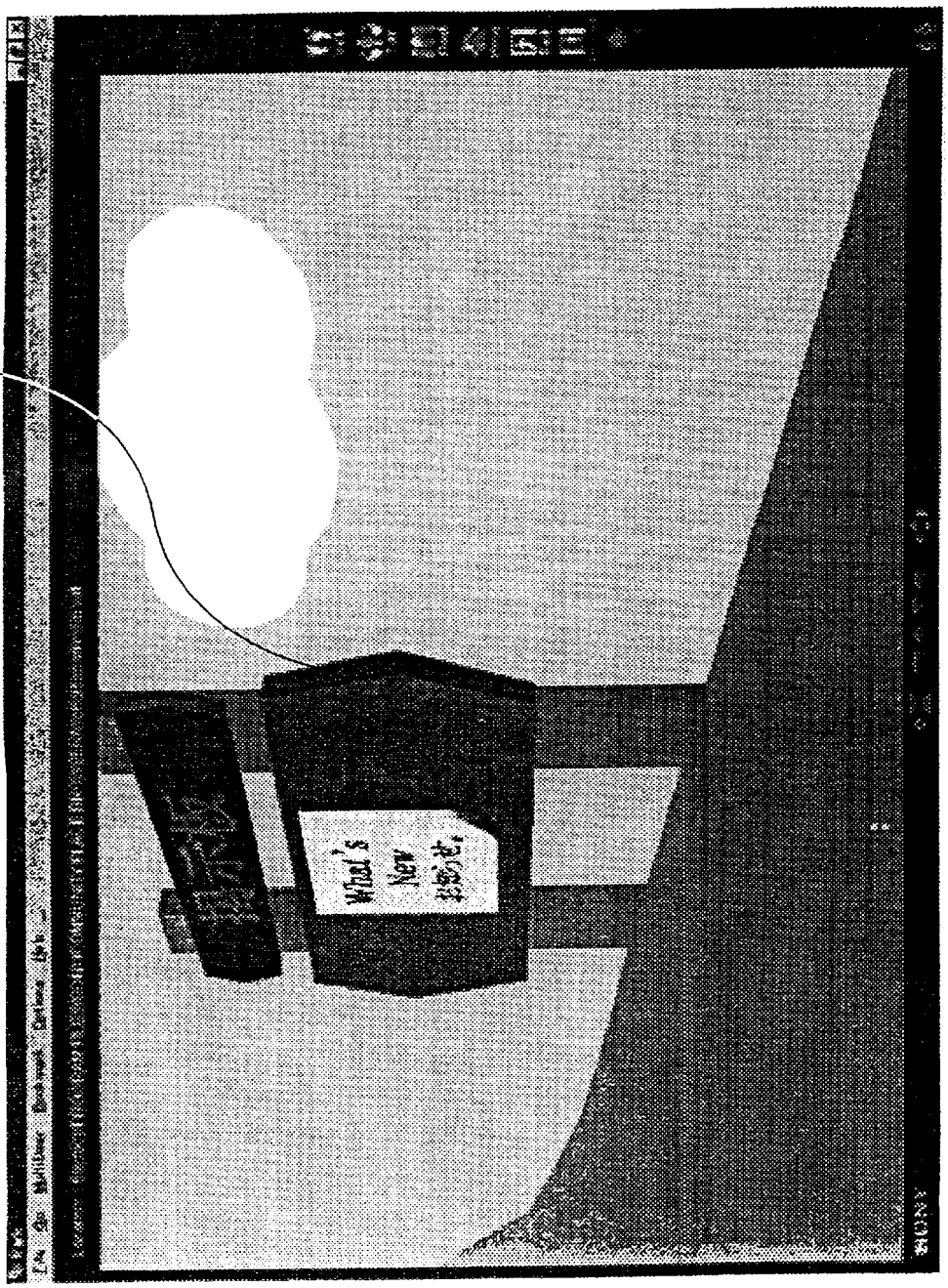
FIG. 10 is a photograph of a halftone image shown on the monitor display illustrating a manner in which the avatar 70 is being navigated.
Figure 11:
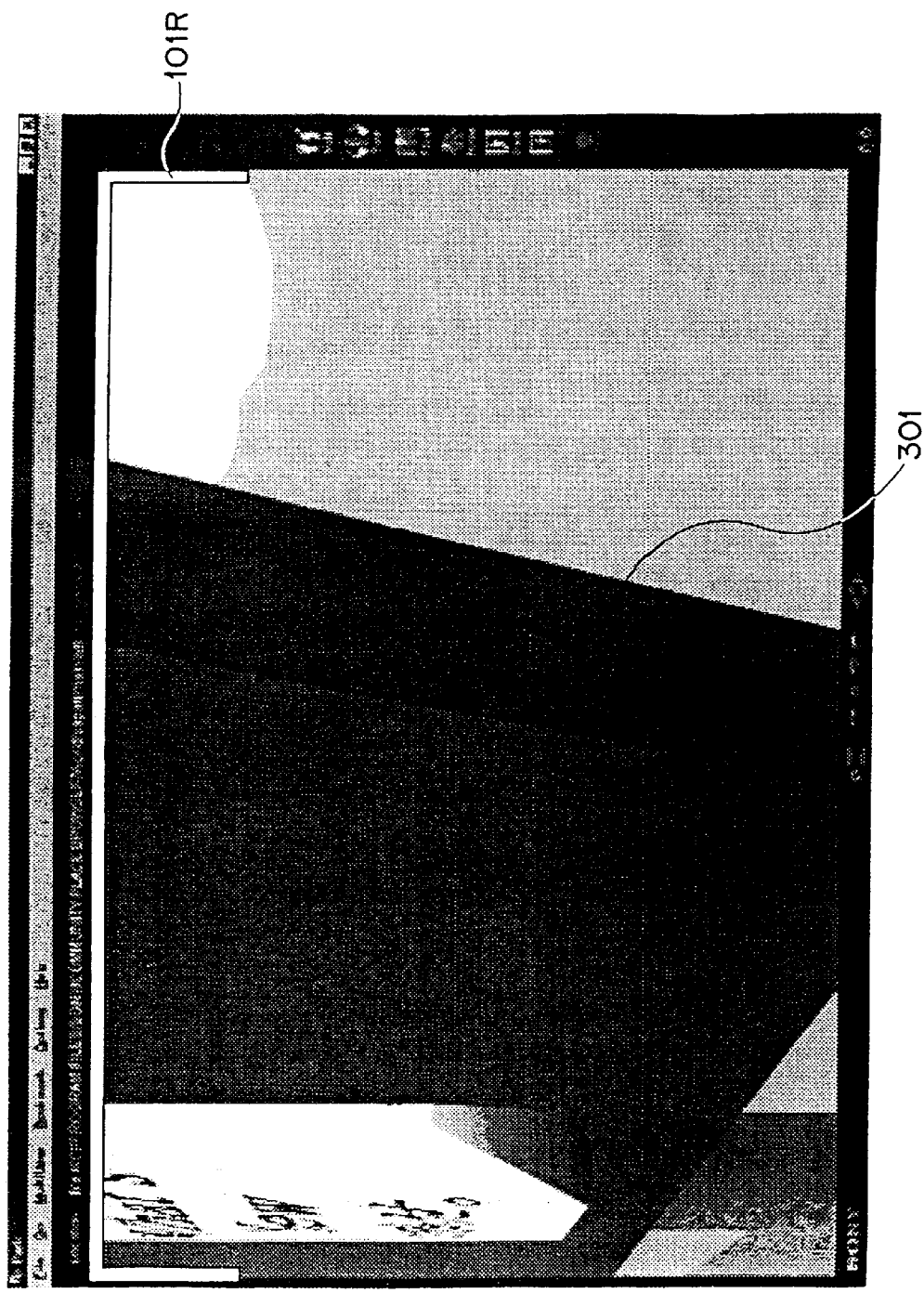
FIG. 11 is a photograph of a halftone image shown on the monitor display illustrating a manner in which the avatar 70 is in collision against an object 301.

In step S13, if a collision of neither the left-foot node 70E nor the right-foot node 70F is detected, then the processing goes to step S15, in which the CPU 30 controls the graphics processor 43 to display the alert frame 101R in the browser display area. This alert frame indicates a collision of the front portion of the head node 70A against the predetermined object. In addition, the CPU 30 controls the sound processor 35 to output the artificial collision sound "Bang" from the speakers 37 and 38. Then, the processing comes to an end. Consequently, as shown in FIG. 10 for example, when the avatar 70 is being navigated forward, if the head node 70A collides against the fixed object 301 simulating a billboard arranged in the virtual space, the alert frame 101R is displayed in the upper portion of the browser display area as shown in FIG. 11. At the same time, the artificial collision sound "Bang" is outputted.

In step S16, the CPU 30 determines whether a collision at the left-foot node 70E or the right-foot node 70F has been detected or not. If a collision at the left-foot node 70E or the right-foot node 70F is detected, then processing goes to step S17, in which the CPU 30 controls the graphics processor 43 to display the alert frame 105Y in the browser display area, this alert frame indicating that one of the rear portion of the head node 70A, the rear portion of the left-foot node 70E, and the rear portion of the right-foot node 70F has collided against the object. In addition, the CPU 30 controls the sound processor 35 to output an artificial sound "Gong" indicative of the collision at the rear portion of the avatar 70 from the speakers 37 and 38. Then, the processing comes to an end. In step S16, if a collision of neither the left-foot node 70E nor the right-foot node 70F is detected, then the processing goes to step S18, in which the CPU 30 controls the graphics processor 43 to display the alert frame 101Y in the browser display area. This alert frame indicates a collision of the rear portion of the head node 70A. In addition, the CPU 30 controls the sound processor 35 to output the artificial sound "Gong" from the speakers 37 and 38. Then, the processing comes to an end.

In step S19, the CPU 30 determines whether a collision at the left-arm node 70C has been detected or not. If the collision at the left-arm node 70C is not detected, the processing goes to step S23. In step S19, of the collision at the left-arm node 70C is detected, the processing goes to step S20, in which the CPU 30 determines whether the avatar 70 is being navigated forward or not. In step S20, if the avatar 70 is found being navigated forward, the processing goes to step S21, in which the CPU 30 controls the graphics controller 43 to display the alert frame 103R in the browser display area. This alert frame indicates a collision of the front portion of the left-arm node 70C against the object. In addition, the CPU controls the sound processor 35 to output the artificial sound "Bang" from the speakers 37 and 38. Then the processing comes to an end. In step S20, if the avatar 70 is found not being navigated forward the processing goes to step S22, in which the CPU 30 controls the graphics processor 43 to display the alert frame 103Y in the browser display area, this alert frame indicating the collision of the rear portion of the left-arm node 70C. In addition, the CPU controls the sound processor 35 to output the artificial sound "Gong" from the speakers 37 and 38. Then, the processing comes to an end.

In step S23, the CPU 30 determines whether a collision at the right-arm node 70D has been detected or not. If the collision at the right-arm node 70D is not detected, the processing goes to step S27. In step S23, if the collision at the right-arm node 70D is detected, the processing goes to step S24, in which the CPU 30 determines whether the avatar 70 is being navigated forward or not. In step S24, if the avatar 70 is found being navigated forward, the processing goes to step S25, in which the CPU 30 controls the graphics controller 43 to display the alert frame 104R in the browser display area. This alert frame indicates a collision of the front portion of the right-arm node 70D against the object. In addition, the CPU controls the sound processor 35 to output the artificial sound "Bang" from the speakers 37 and 38. Then the processing comes to an end. In step S24, if the avatar 70 is found not being navigated forward the processing goes to step S26, in which the CPU 30 controls the graphics processor 43 to display the alert frame 104Y in the browser display areas. This alert frame indicates the collision of the rear portion of the right-arm node 70D. In addition, the CPU controls the sound processor 35 to output the artificial sound "Gong" from the speakers 37 and 38. Then, the processing comes to an end.

In step S27, the CPU determines whether a collision at the left-foot node 70E or the right-foot node 70F has been detected or not. If a collision at neither the left-foot node 70E or the right-foot node 70F is detected, it indicates that a collision of the avatar 70 has not been detected, upon which the processing comes to an end. In step S27, if the collision of the left-food node 70E or the right-foot node 70F is found detected, the processing goes to step S28, in which the CPU 30 determines whether the avatar 70 is being navigated forward or not. If the avatar 70 is found being navigated forward in step S28, the processing goes to step S29, in which the CPU 30 controls the graphics processor 43 to display the alert frame 102R in the browser display area, this alert frame indicating the collision of the front portion of the left-foot node 70E or the front portion of the right-foot node 70F. In addition, the CPU controls the sound processor 35 to output the artificial sound "Bang" from the speakers 37 and 38. Then, the processing comes to an end.

Figure 12:
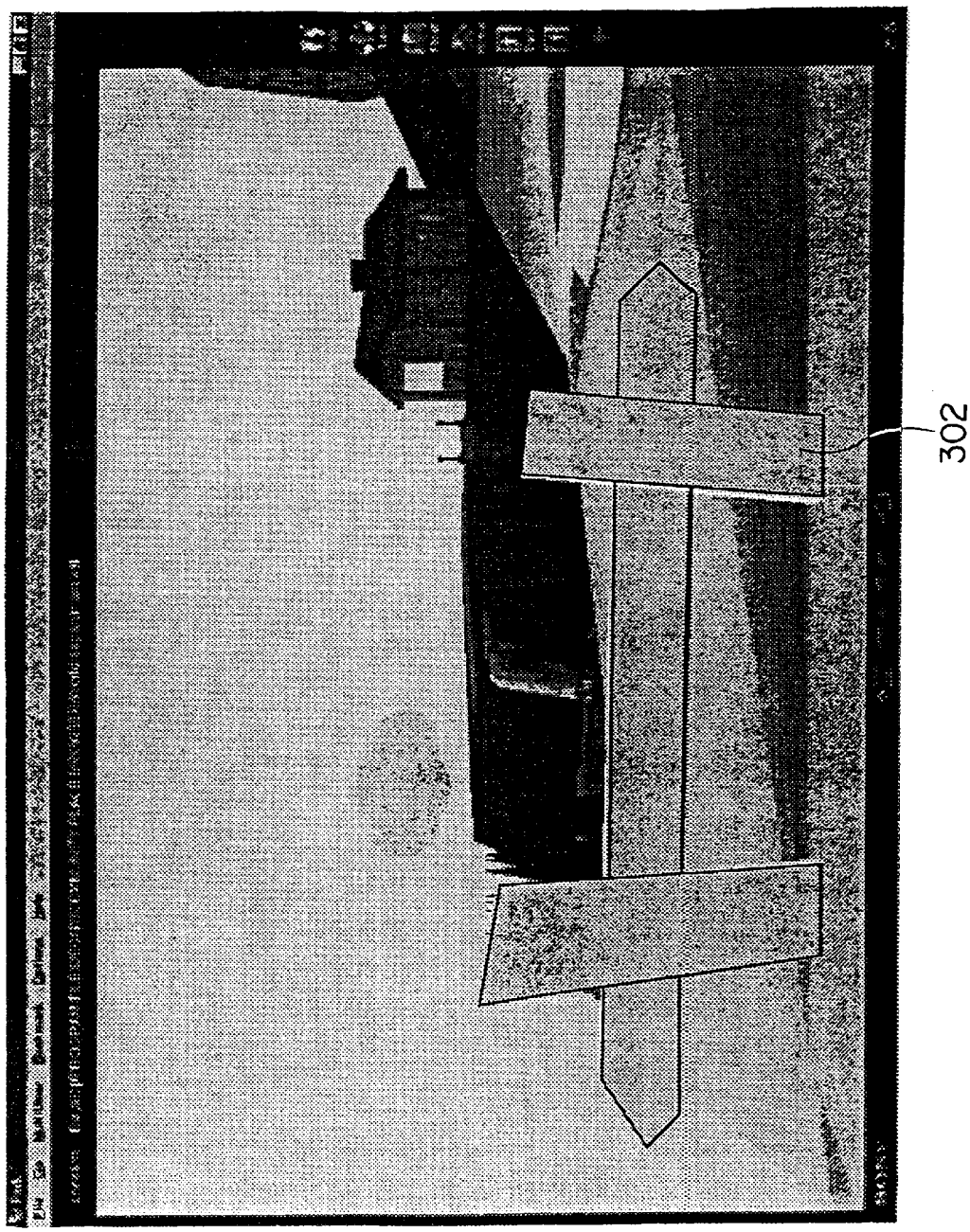
FIG. 12 is a photograph of a halftone image shown on the monitor display illustrating another manner in which the avatar 70 is being navigated.
Figure 13:
FIG. 13 is a photograph of a halftone image shown on the monitor display illustrating another manner in which the avatar 70 is in collision against the object 301.
Figure 14:
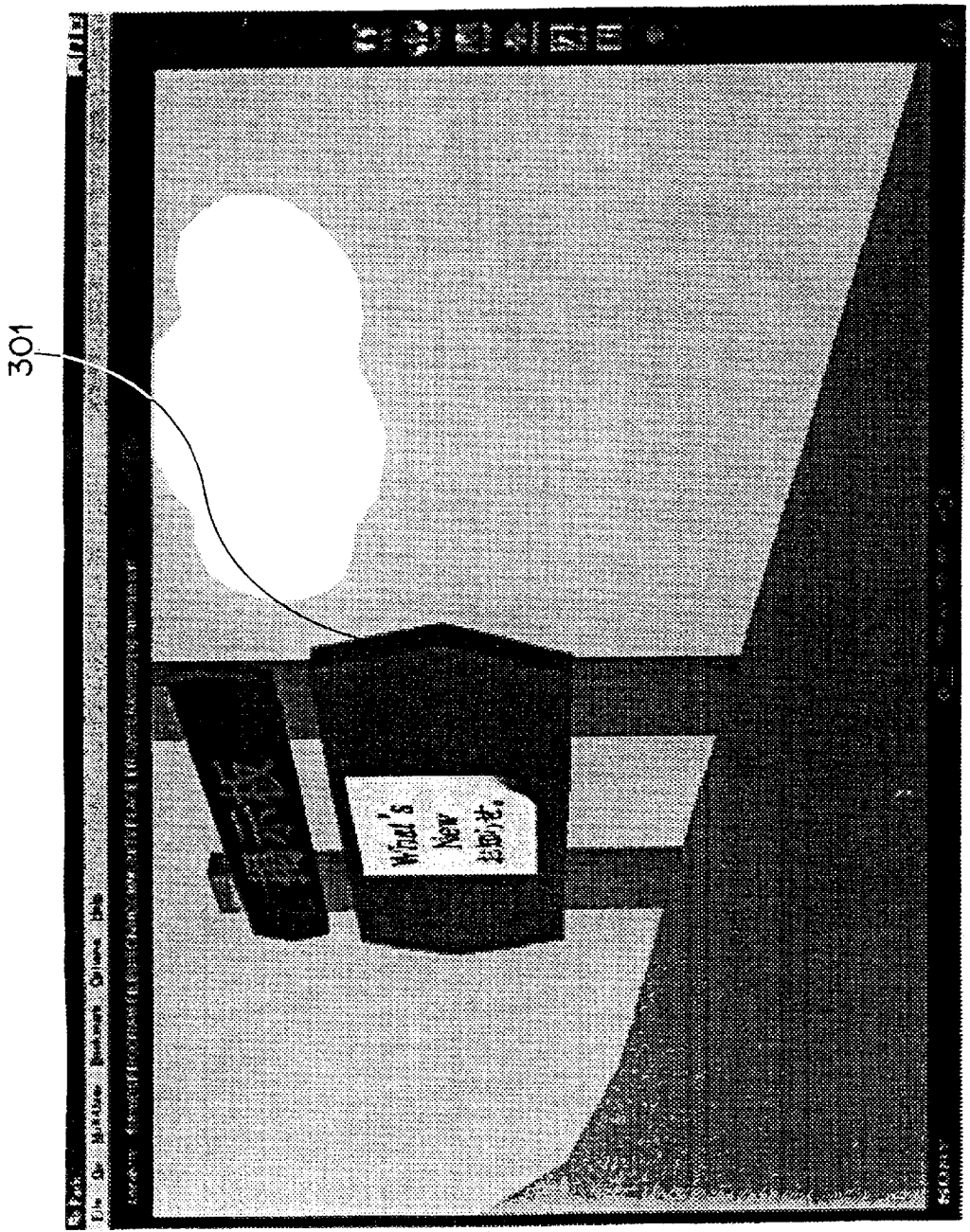
FIG. 14 is a photograph of a halftone image shown on the monitor display illustrating a manner in which the avatar 70 is being navigated in a three-dimensional virtual space in a related-art browser.

Consequently, as shown in FIG. 12, for example, when the avatar 70 is being navigated forward, if the front portion of the left-foot node 70E or the front portion of the right-foot node 70F collides against an object 302, the alert frame 102R is displayed in the lower portion of the browser display area as shown in FIG. 13. At the same time, the artificial collision sound "Bang" is outputted. It should be noted that, in FIG. 13, the object 302 shown in FIG. 12 exists under the feet of the avatar 70, although the object is not displayed in the browser display area.

In step S28, if the avatar 70 is found not being navigated forward, the processing goes to step S30, in which the CPU 30 controls the graphics processor 43 to display the alert frame 102Y in the browser display areas. This alert frame indicates a collision of the rear portion of the left-foot node 70E or the rear portion of the right-foot node 70F. In addition, the CPU controls the sound processor 35 to output the artificial sound "Gong" from the speakers 37 and 38. Then, the processing comes to an end.

Thus, the alert frames are displayed according to the situations in which the avatar 70 collided against a predetermined object, or according to the colliding nodes of the avatar 70, thereby allowing the user to understand the collision situation in an intuitive manner. In addition, an artificial collision sound is outputted at the same time an alert frame is displayed. The artificial collision sound is "Bang" or "Gong" depending on whether the avatar has collided at the front or back thereof. This arrangement also allows the user to understand a collision situation in an intuitive manner.

It should be noted that the computer program for executing the above-mentioned various processing operations is provided to the user through recording media such as CD-R (Compact Disc Recordable), CD-ROM, or floppy disk, or through a network. The computer program thus provided can be stored in the incorporated RAM or hard disk, as required for use by the system.

The present invention can be implemented by use of a general-purpose personal computer system without resorting to a dedicated apparatus. For example, the present invention can be embodied by installing the above-mentioned program onto the general-purpose personal computer from a program providing medium such as floppy disk or CD-ROM and executing the above-mentioned various processing operations based on the installed program.

The program providing medium may also be a communication medium (such as communication line, communication network, communication system, or other medium that holds the program temporarily and in flux. For example, the above-mentioned program may be presented at a WWW server in the Internet or a BBS (Bulletin Board System) of a communication network, from which the program is downloaded through a network to be installed on the general-purpose personal computer. The program thus installed may then be started and, under the control of the OS (Operating System) of the general-purpose personal computer, executed along with another application program for executing the above-mentioned various processing operations.

As described and according to the three-dimensional virtual space information processing apparatus, the three-dimensional virtual space information processing method, and the program providing medium, the colliding node of an avatar is detected when it collides with a predetermined object, an alert frame is displayed and a collision sound is outputted corresponding to the detected colliding node. This novel constitution allows the user to intuitively understand a situation in which the avatar collided against the predetermined object.

As many apparently different embodiments of this invention may be made without departing from the spirit and scope thereof, it is to be understood that the invention is not limited to the specific embodiments thereof.

What is claimed is:

1. An apparatus for displaying an image as viewed from a viewpoint of an avatar object located in a three-dimensional virtual space as said avatar object is navigated, the apparatus comprising:

a collision node detecting means for detecting at least one collision node of a plurality of collision nodes associated with different two-dimensional portions of said avatar object when said avatar object collides with another object in said three-dimensional virtual space; and an alerting means for outputting an alert corresponding to said colliding node detected by said collision node detecting means, wherein said alert indicates that a specific two-dimensional portion of said avatar object has collided with said another object by displaying an alert frame at a position on a display screen corresponding to a position of said colliding node being detected by said collision node detecting means.

2. The apparatus of claim 1, wherein said collision node detecting means detects a collision of said avatar object at one of a left node and a right node of said avatar object against said another object, and said alerting means displays an alert frame at a position on a display screen corresponding to one of said left node and said right node detected by said collision node detecting means.

3. The apparatus of claim 1, wherein said collision node detecting means detects a collision of said avatar object at one of an upper node and a lower node of said avatar object against said another object and said alerting means displays an alert frame at a position on a display screen corresponding to one of said upper node and said lower node detected by said collision node detecting means.

4. The apparatus of claim 1, wherein said collision node detecting means detects a collision of said avatar object at one of an upper node, a lower node, a left node, and a right node of said avatar object against said another object and said alerting means displays an alert frame at a position on a display screen, corresponding to one of said upper node, said lower node, said left node, and said right node detected by said collision node detecting means.

5. The apparatus of claimed 1, wherein said alerting means generates an alert sound corresponding to said colliding node detected by said collision node detecting means.

6. The apparatus of claim 1, wherein said alerting means displays an alert frame at a position on a display screen corresponding to said colliding node detected by said collision node detecting means and generates an alert sound corresponding to said colliding node.

7. The apparatus of claim 1, wherein said collision node detecting means detects a collision of said avatar object at one of a front node and a rear node of said avatar object against said another object and said alerting means displays an alert frame on a display screen, said alert frame comprising a display pattern corresponding to one of said front node and said rear node detected by said collision node detecting means.

8. An apparatus for displaying an image as viewed from a viewpoint of an avatar object located in a three-dimensional virtual space as said avatar object is navigated, the apparatus comprising:

a collision node detecting means for detecting a collision node of said avatar object when said avatar object collides with another object in said three-dimensional virtual space, wherein said avatar object comprises a plurality of collision nodes, including at least an upper node and a lower node of each of a front node and a rear node that correspond with an associated portion of said avatar;

an alerting means for outputting an alert indicating that a front or rear portion of said avatar object has collided with said another object by displaying an alert frame comprising a display pattern corresponding to one of said front node and said rear node detected by said collision detecting means on a display screen, wherein said alert further indicates which two-dimensional portion of said avatar object has collided with said another object by displaying said alert frame at a position on the display screen corresponding to one of said upper node and said lower node detected by said collision node detecting means.

9. An apparatus for displaying an image as viewed from a viewpoint of an avatar object located in a three-dimensional virtual space as said avatar object is navigated, the apparatus comprising:

a collision node detecting means for detecting a collision node of said avatar object at one of an upper node, a lower node, a left node, and a right node of each of a front node and a rear node when said avatar object collides with another object in said three-dimensional virtual space; and an alerting means for outputting an alert indicating that a front or rear portion of said avatar object has collided with said another object by displaying an alert frame comprising a display pattern corresponding to one of said front node and said rear node detected by said collision detecting means on a display screen, wherein said alert further indicates which two-dimensional portion of said avatar object has collided with said another object by displaying said alert frame at a position on the display screen corresponding to one of said upper node, said lower node, said left node, and said right node detected by said collision node detecting means.

10. A method for displaying an image as viewed from a viewpoint of an avatar object located in a three-dimensional virtual space as said avatar object is navigated, the method comprising the steps of:

detecting when said avatar object collides against another object in said three-dimensional virtual space; and displaying an alert frame at a position corresponding to a position of a two-dimensional portion of said avatar object detected as colliding with said another object in said detecting step.

11. The method of claim 10, wherein:

said detecting step comprises detecting a collision of one of a left node and a right node of said avatar object against said another object and said displaying step comprises displaying said alert frame at a position on said display screen corresponding to said one of the left node and the right node detected in said detecting step.

12. The method of claim 10, wherein:

said detecting step comprises detecting a collision of said avatar object at one of an upper node and a lower node of said avatar object against said another object; and said displaying step comprises displaying said alert frame at a position on said display screen corresponding to said one of said upper node and said lower node detected in said detecting step.

13. The method of claim 10, wherein:

said detecting step comprises detecting a collision of said avatar object at one of an upper node, a lower node, a left node, and a right node of said avatar object against said another object and said displaying step comprises displaying said alert frame at a position on said display screen corresponding to said one of said upper node, said lower node, said left node, and said right node detected by said collision node detecting means.

14. The method of claim 10, further comprising outputting an alert sound corresponding to said two-dimensional portion of said avatar object detected in said detecting step.

15. A medium for providing a program for displaying an image as viewed from a viewpoint of an avatar object located in a three-dimensional virtual space as said avatar object is navigated, said program comprising the steps of:

detecting when said avatar object collides against another object in said three-dimensional virtual space; and displaying an alert frame at a position on a display screen corresponding to a position of a two-dimensional portion of said avatar object detected as colliding with said another object in said detecting step.

16. The medium of claim 15, wherein:

said detecting step of said program comprises detecting a collision of one of a left node and a right node of said avatar object against said another object and said displaying step of said program comprises displaying said alert frame at a position on a display screen corresponding to said one of the left node and the right node detected in said detecting step.

17. The medium of claim 15, wherein:

said detecting step of said program comprises detecting a collision of said avatar object at one of an upper node and a lower node of said avatar object against said another object; and said displaying step of said program comprises displaying said alert frame at a position on a display screen corresponding to one of said upper node and said lower node detected in said detecting step.

18. The medium of claim 15, wherein:

said detecting step of said program comprises detecting a collision of said avatar object at one of an upper node, a lower node, a left node, and a right node of said avatar object against said another object and said displaying step of said program comprises displaying said alert frame at a position on a display screen corresponding to said one of said upper node, said lower node, said left node, and said right node detected in said detecting step.

19. The medium of claim 15, further comprising outputting an alert sound corresponding to said two-dimensional portion of said avatar object detected in said detecting step.

20. A method for displaying an image as viewed from a viewpoint of an avatar object located in a three-dimensional virtual space as said avatar object is navigated, the method comprising the steps of:

detecting when said avatar object collides against another object in said three-dimensional virtual space at one of a front node and a rear node of said avatar object; and displaying an alert frame on a display screen, said alert frame comprising a display pattern corresponding to one of said front node and said rear node detected in said detecting step.

21. A method for displaying an image as viewed from a viewpoint of an avatar object located in a three-dimensional virtual space as said avatar object is navigated, the method comprising the steps of:

detecting when said avatar object collides against another object in said three-dimensional virtual space at one of an upper node and a lower node of each of a front node and a rear node; and displaying an alert frame comprising a display pattern corresponding to one of said front node and said rear node at a position corresponding to one of said upper node and said lower node on a display screen depending on the outcome of the detecting step.

22. A method of displaying an image as viewed from a viewpoint of an avatar object located in a three-dimensional virtual space as said avatar object is navigated, the method comprising the steps of:

detecting when said avatar object collides against another object in said three-dimensional virtual space at one of an upper node, a lower node, a left node, and a right node, of each of a front node and a rear node; and displaying an alert frame comprising a display pattern corresponding to one of said front node and said rear node at a position corresponding to one of said upper node, said lower node, said left node, and said right node on a display screen depending on the outcome of the detecting step.

23. A medium for providing a program for displaying an image as viewed from a viewpoint of an avatar object located in a three-dimensional virtual space as said avatar object is navigated, said program comprising the steps of:

detecting when said avatar object collides against another object in said three-dimensional virtual space at one of a front node and a rear node of said avatar object; and displaying an alert frame on a display screen, said alert frame comprising a display pattern corresponding to one of said front node and said rear node detected in said detecting step of said program.

24. A medium for providing a program for displaying an image as viewed from a viewpoint of an avatar object located in a three-dimensional virtual space as said avatar object is navigated, said program comprising the steps of:

detecting when said avatar object collides against another object in said three-dimensional virtual space at one of an upper node and a lower node of each of a front node and a rear node; and displaying an alert frame comprising a display pattern corresponding to one of said front node and said rear node at a position corresponding to one of said upper node and said lower node on a display screen depending on the outcome of the detecting step of said program.

25. A medium for providing a program for displaying an image as viewed from a viewpoint of an avatar object located in a three-dimensional virtual space as said avatar object is navigated, said program comprising the steps of:

detecting when said avatar object collides against another object in said three-dimensional virtual space at one of an upper node, a lower node, a left node, and a right node, of each of a front node and a rear node; and displaying an alert frame comprising a display pattern corresponding to one of said front node and said rear node at a position corresponding to one of said upper node, said lower node, said left node, and said right node on a display screen depending on the outcome of the detecting step of said program.

* * * * *